Sept. 9, 1969 A. J. MOSES 3,466,463

BIPOLAR LIMITING CIRCUIT

Filed April 11, 1967

INVENTOR.
ADRIAN J. MOSES

BY Bruce C Lutz

ATTORNEY

United States Patent Office
3,466,463
Patented Sept. 9, 1969

3,466,463
BIPOLAR LIMITING CIRCUIT
Adrian J. Moses, Rush City, Minn., assignor to Honeywell Inc., Minneapolis, Minn., a corporation of Delaware
Filed Apr. 11, 1967, Ser. No. 630,048
Int. Cl. H03k 5/08
U.S. Cl. 307—237 5 Claims

ABSTRACT OF THE DISCLOSURE

A circuit for providing limiting action in both polarities so that it will provide limiting for both AC and DC signals with no requirements for an external power source.

This invention pertains generally to electronic circuits and more particularly to a circuit for providing both AC and DC limiting action using a single Zener diode so that temperature effects such as are involved using two Zener diodes back-to-back are eliminated.

It is therefore an object of this invention to provide an improved bipolar limiting circuit.

Other objects and advantages of this invention will be apparent from reading the specification and appended claims in conjunction with the drawings wherein:

Figure 1:
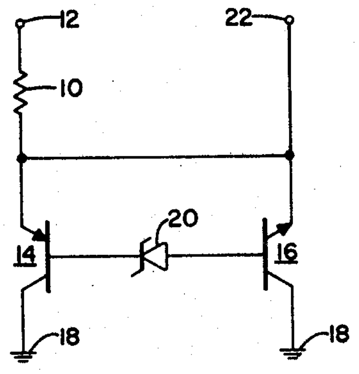
FIGURE 1 is a circuit diagram of a preferred embodiment of the invention.

In FIGURE 1 a resistance or impedance means 10 is shown connected between an input terminal 12 and an emitter of a solid state control means, switch means, or PNP transistor 14. The collector of the transistor 14 is connected to ground. A solid state control means, second switch means, or NPN transistor generally designated as 16 is connected in parallel with transistor 14 between resistor 10 and ground or reference potential 18 such that the two emitters and two collectors of transistors 14 and 16 are connected together. A voltage sensitive means or Zener diode 20 is utilized to connect the bases of the two transistors 14 and 16 together with the anode connected to the base of transistor 16. While all diodes have a zenering or reverse breakdown voltage, the diodes which have a controlled breakdown voltage are called Zener diodes. The emitter of transistor 16 is further connected to an output terminal means 22.

As is well known by those skilled in the art, double anode Zener diodes have been used for a considerable period of time for providing both AC and DC limiting. However, this simple circuit suffered two deficiencies. One was the high cost of selecting units so that both Zener diodes had the same breakdown voltage and the second is temperature compensating both units so that the curve for the zenering action is the same in both directions.

These problems are solved in the present circuit since only one Zener diode is utilized. The breakdown curves of the two transistors are an insignificant portion of the total breakdown curve and for all practical purposes may be eliminated from the breakdown characteristic. In operation, a positive voltage is applied to terminal 12, the voltage will eventually rise high enough so that the Zener diode 20 breaks down and there is current flow from the emitter to base of transistor 14 and from base to collector of transistor 16. Transistor 16 in this configuration is being utilized in a "chopper" configuration in that the collector is being used as an emitter. Transistors can be used in this fashion and it merely results in a lower gain being obtained than when the emitter is used as in a normal configuration. The current flow through Zener diode 20 acts to turn transistor 14 to an ON condition and further increases in current flow will flow directly from the emitter to collector of transistor 14 and thus to ground 18. If the voltage applied to terminal 12 becomes negative in potential, current will flow from the collector to the base of transistor 14, break down the diode 20 and flow from base to emitter of transistor 16 and out terminal 12. This will act to turn transistor 16 ON and provide a direct short circuit from ground 18 to the emitter of transistor 16 for any increases in potential over the zenering voltage of diode 20. As will be realized, the voltage drop between collector and emitter of the transistor 16 cannot drop below the zenering voltage otherwise the Zener diode 20 will starve out the current supply to transistor 16 and it will have to turn to an OFF condition. Therefore, it seeks a balance such that the voltage drop from collector to emitter is approximately the same as the Zener diode drop. The same is of course true with respect to transistor 14 when the applied potential is positive since there can be no current flow from emitter to base until the zenering voltage of diode 20 is reached. Thus, as the input potential is raised, the potential at output terminal 22 is raised until the zenering voltage occurs and after this point the output potential stays at a substantially constant value which is almost entirely dependent upon the zenering characteristics of diode 20.

Figure 2:
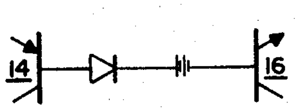
FIGURE 2 illustrates a modification of FIGURE 1.

As will be realized, since the forward voltage drop of diode 20 is utilized in this circuit, the Zener 20 can be replaced by the series diode and battery combination shown in FIGURE 2. This will produce the same effect as is provided by Zener diode 20. Therefore, the invention is not limited to a Zener diode but is usable with any voltage sensitive means which allows current flow therethrough when a voltage is applied thereto of greater than a predetermined potential.

Further, it will be realized by those skilled in the art that since the circuit of FIGURE 1 is bilateral through the use of complementary symmetry transistors, the two emitters can be connected to ground 18 and the collectors connected to output 22. The circuit will still operate with this alteration without the necessity of further changes.

What is claimed is:

1. Apparatus of the class described comprising, in combination:
- first means for receiving an input signal to be limited;
- second means for providing an output signal of not greater than a first predetermined magnitude;
- first and second semiconductor means of opposite polarity types including at least three terminal means;
- means connecting a first of said three terminal means of each of said first and second semiconductor means together and between said first and second means;
- reference potential means connected to a second of said terminal means of each of said first and second semiconductor means;
- means for passing current therethrough when a voltage of greater than a second predetermined magnitude is applied thereacross; and
- means connecting said last named means between the third of said terminal means of said first and second semiconductor means.

2. Apparatus as described in claim 1 wherein the first and second semiconductor means are transistor means and the third terminal means is the base thereof and the means for passing a current therethrough is a Zener diode.

3. Apparatus for providing bipolar limiting of an input signal comprising in combination:
- input means for receving an input signal to be limited;
- output means for providing a limited amplitude output signal;
- isolation means, connecting said input means to said output means, for reducing the effect of limiting actions on any signal sources connected to said input means;

reference potential means; and means, including at least a complementary pair of solid state control means and only one Zener diode, for providing bipolar limiting action connected between said output means and said reference potential means.

4. Apparatus as described in claim 3 wherein the isolating means is a resistor and the last named means comprises two complementary transistors with their emitters and collectors connected in parallel between said output means and said reference potential means and said Zener diode is connected between the bases of said transistors.

5. Apparatus as described in claim 3 wherein the isolating means is a resistor and the last named means consists of two complementary transistors and a Zener diode and the transistors have their emitters and collectors connected in parallel between said output means and said reference potential means and said Zener diode is connected between the bases of said transistors.

References Cited

UNITED STATES PATENTS

| | | | |
|---|---|---|---|
| 2,874,293 | 2/1959 | McMurren | 307—318 XR |
| 3,060,330 | 10/1962 | Trampel | 307—318 XR |
| 3,117,238 | 1/1964 | McNair | 307—313 XR |
| 3,234,405 | 2/1966 | Cordero | 307—313 XR |
| 3,287,620 | 11/1966 | Tuszynski | 307—255 XR |
| 3,329,910 | 7/1967 | Moses | 307—255 XR |
| 3,381,234 | 4/1968 | Zane | 307—313 XR |

JOHN S. HEYMAN, Primary Examiner

STANLEY T. KRAWCZEWICZ, Assistant Examiner

U.S. Cl. X.R.

307—313, 318; 328—171